US008707293B2

(12) United States Patent
Festi

(10) Patent No.: US 8,707,293 B2
(45) Date of Patent: Apr. 22, 2014

(54) PACKAGE MANAGEMENT SYSTEM

(75) Inventor: Florian Festi, Oldenburg (DE)

(73) Assignee: Red Hat, Inc., Raleigh, NC (US)

( * ) Notice: Subject to any disclaimer, the term of this patent is extended or adjusted under 35 U.S.C. 154(b) by 677 days.

(21) Appl. No.: 12/717,036

(22) Filed: Mar. 3, 2010

(65) Prior Publication Data

US 2011/0219368 A1 Sep. 8, 2011

(51) Int. Cl.
*G06F 9/445* (2006.01)

(52) U.S. Cl.
USPC ........... 717/174; 717/175; 717/176; 717/177; 717/178

(58) Field of Classification Search
None
See application file for complete search history.

(56) References Cited

U.S. PATENT DOCUMENTS

| 5,721,824 | A * | 2/1998 | Taylor | 709/203 |
|---|---|---|---|---|
| 5,802,375 | A * | 9/1998 | Ngo et al. | 717/160 |
| 5,867,714 | A * | 2/1999 | Todd et al. | 717/172 |
| 6,681,391 | B1 * | 1/2004 | Marino et al. | 717/175 |
| 6,847,970 | B2 * | 1/2005 | Keller et al. | 1/1 |
| 7,152,157 | B2 * | 12/2006 | Murphy et al. | 713/100 |
| 7,222,341 | B2 * | 5/2007 | Forbes et al. | 717/170 |
| 7,334,222 | B2 * | 2/2008 | Keller | 717/135 |
| 7,398,480 | B2 * | 7/2008 | Zimniewicz et al. | 715/841 |
| 7,418,700 | B2 * | 8/2008 | Zimniewicz et al. | 717/175 |
| 7,490,077 | B2 * | 2/2009 | Mourra et al. | 1/1 |
| 7,496,912 | B2 * | 2/2009 | Keller et al. | 717/174 |
| 7,536,401 | B2 * | 5/2009 | Bitonti et al. | 1/1 |
| 7,668,665 | B2 * | 2/2010 | Kim | 702/33 |
| 7,865,874 | B2 * | 1/2011 | Wookey | 717/120 |
| 8,006,230 | B2 * | 8/2011 | Agarwal et al. | 717/120 |
| 8,341,622 | B1 * | 12/2012 | Eatough | 717/177 |
| 2004/0049372 | A1 * | 3/2004 | Keller | 703/22 |
| 2004/0049565 | A1 * | 3/2004 | Keller et al. | 709/223 |
| 2004/0255273 | A1 * | 12/2004 | Chan | 717/120 |
| 2005/0192979 | A1 * | 9/2005 | Keller et al. | 707/100 |
| 2005/0193381 | A1 * | 9/2005 | Hellerstein et al. | 717/144 |
| 2005/0204358 | A1 * | 9/2005 | Hellerstein et al. | 718/104 |
| 2005/0262482 | A1 * | 11/2005 | Wagner et al. | 717/120 |
| 2005/0273772 | A1 * | 12/2005 | Matsakis et al. | 717/136 |

OTHER PUBLICATIONS

Red Hat Enterprise Linux 5 Deployment Guide, deployment, configuration and administration of Red Hat Enterprise Linux 5, Chapters 10-12, pp. 127-151, Oct. 2008.

* cited by examiner

*Primary Examiner* — Henry Tsai
*Assistant Examiner* — Jing-Yih Shyu
(74) *Attorney, Agent, or Firm* — Lowenstein Sandler LLP

(57) ABSTRACT

A package manager that determines circular dependencies in a list of software packages to be installed on a client computer and resolves those circular dependencies so that the list of software packages can be installed is described. The package manager receives a list of software packages along with information regarding the dependencies of the software packages. The package manager generates a directed graph of the software packages based on the dependency information. Using the directed graph, the package manager determines strongly coupled components to collect and install, where each strongly coupled component includes a set of dependent components. The package manager further installs these strongly coupled components.

20 Claims, 6 Drawing Sheets

PACKAGE MANAGEMENT SYSTEM

TECHNICAL FIELD

Embodiments of the present invention relate to a method and system for managing packages. Specifically, embodiments of the invention relate to handling dependencies when installing software packages in a computer.

BACKGROUND

A typical client computer has hundreds or thousands of software components that are used to run the computer. For example, the client computer can have at least one operating system, dozens or hundreds of software applications, and supporting libraries installed on the computer. Installation or updating these software components can be done either manually or using a package manager. One type of package manager known in the art is the RPM package manager. Package managers present a uniform way to install and/or update software programs and associated components.

To install a set of software packages, a package manager orders the packages and its dependent packages in topological order onto a graph. The package manager then collects the packages at the bottom of the graph and installs these packages first. The package manager then moves up the graph and installs the next set of packages.

A problem common with package managers is that circular dependencies can arise between mutually dependent packages. Using the graph representation described above, this will create loops in the graph. Circular dependencies can prevent installation of these mutually dependent packages. One way to handle this is to remove one of the packages from installation in order to break the loop. However, this may break the overall installation because dependent packages do not get installed.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A package manager that determines circular dependencies in a list of software packages to be installed on a client computer and resolves those circular dependencies so that the list of software packages can be installed is described. In one embodiment, the package manager receives a list of software packages along with information regarding the dependencies of the software packages. The package manager generates a directed graph of the software packages based on the dependency information. Using the directed graph, the package manager determines strongly coupled components to collect and install, where each strongly coupled component includes a set of dependent components. The package manager further installs these strongly coupled components.

Figure 1:
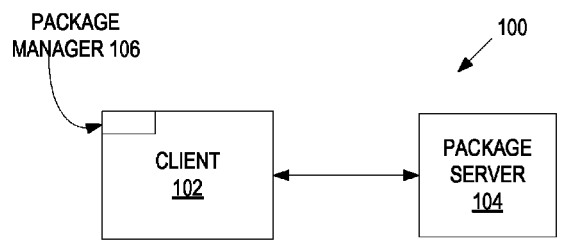
FIG. 1 is a block diagram of one embodiment of a client computer using a package manager to install software packages from a package server.

FIG. 1 is a block diagram of one embodiment of a client computer 102 that includes a package manager 106 to install software packages from a package server 104. In FIG. 1, the client computer 102 initiates an install of a new or complete software package onto the computer. Alternatively, the client computer 102 installs updates to existing software packages. The client computer 102 can be one of a personal computer, a laptop, cellular phone, server, smartphone, personal digital assistant, portable music player, tablet computer, etc., or another computer as known in the art. Package server 104 is a server that serves software packages to client computer 102. While in one embodiment, package server 104 is a repository of the software packages used by client computer 102, in an alternate embodiment, server computer 104 acts as a conduit for software packages stored in other software package repositories located on other servers, or combinations thereof.

In one embodiment, client computer 102 includes package manager 106 that installs the desired software packages. In this embodiment, the package manager 106 receives information for the software packages to install and request these packages from the package server 104. The package manager 106 installs the software packages on the client computer 102 by installing first those software package that are not dependent on other software packages (e.g., supporting software libraries) and then installs other software packages that depend on the initially installed software packages (e.g., software application that make use of the initially installed supporting software libraries).

In order to resolve potential circular dependencies in the received software packages, package manager 106 receives the installation software package dependencies and generates a directed graph using the installation software package dependencies. A dependent software package is dependent on another software package if the dependent software package uses the supporting software package to run or install the dependent software package. In contrast, a supporting software package supports running or installing of a dependent software package.

In one embodiment, there are two different type of dependencies: normal dependencies and prerequisite dependencies. One software package is normally dependent on a supporting software package if the dependent software package uses the supporting software package to run. In a prerequisite dependency, the dependent software package uses the supporting software package during installation. As illustrated, a prerequisite dependency is a stronger dependency than normal dependency, because the supporting software package is required during installation of the dependent software package.

Package manager 106 further performs a search for strongly connected software packages in the directed graph. As used herein, a component refers to a software package. In one embodiment, a strongly connected component is a component that has a dependency path on the directed graph to a second component and the second component has another dependency path back to that original component. In one embodiment, the package manager 106 performs a depth first search to determine the strongly connected components, using a depth first search, such as Tarjan's algorithm as known in the art.

With the identified strongly connected components, the package manager 106 determines if these strongly connected components have prerequisite supporting components. If there are, the package manager 106 determines which of the prerequisite supporting components is furthest away from the strongly coupled component. The package manager 106 removes this component and re-runs the depth search first algorithm to determine other strongly connected components. If the package manager does not find that a strongly connected component has any prerequisite supporting components, the package manager 106 collects the supporting components and installs them. Installation of software packages is further described in FIG. 3 below. While in one embodiment, the package manager 106 can install a handful of components (e.g., a new or updated software application), in alternate embodiments, package manager 106 can install thousands, tens of thousands, or more components (e.g., a new operating system, an operating system upgrade, etc.).

Figure 2:
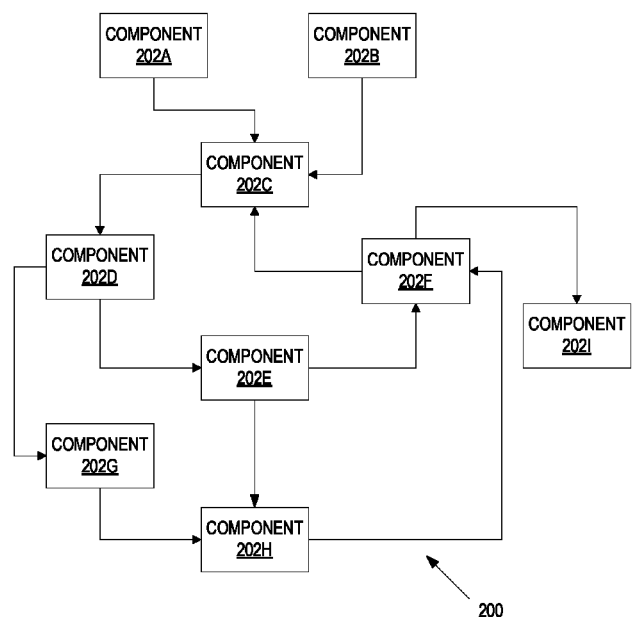
FIG. 2 is a block diagram of one embodiment of a directed graph of software packages dependencies.

As described above, the package manager 106 generates a directed graph of installation software packages in order to find the strongly connected components. FIG. 2 is a block diagram of one embodiment of a directed graph 200 of software packages dependencies. In FIG. 2, directed graph 200 illustrates a set of dependencies between different software packages, or components. Components 202A-I represent different software packages that can be installed in a client computer, such as client computer 102 in FIG. 1. In one embodiment, each of the software packages can be an operating system component, application program, support library, application data, application and general documentation, translations into single or multiple languages, other data, etc. As illustrated in FIG. 2, the components have dependencies between them. The direction of the arrow designates the which component is a dependent component. The component in which an arrow emanates is dependent on the supporting component the arrow is pointing to. For example in one embodiment, components 202A-B are dependent on component 202C. Component 202C is dependent on components 202D-I. The problem lies in that component 202C is a strongly connected component. This is because there are two dependency paths: one from component 202C→component 202D (direct connection) and three other paths from component 202D→component 202C (a path via component 202E-F, a path via component 202G, 202H, and 202F, and a path via component 202E, 202H, and 202F). In other words, component 202C is both a dependent component and a supporting component. Components 202D-H are also strongly connected components.

In one embodiment, a package manager, such as package manager 106 of FIG. 1 above, would collect component 202I as this component is not dependent on any other component. As used herein, to collect a component, the package manager would install this component on the client computer using an install script for this component. For example in one embodiment, to collect the software component 202I, the package manager runs the install script associated with component 202I. In one embodiment, a collected component is removed from the directed graph. In this embodiment, the nodes and edges corresponding to the collected component are deleted from the directed graph.

Figure 3A:
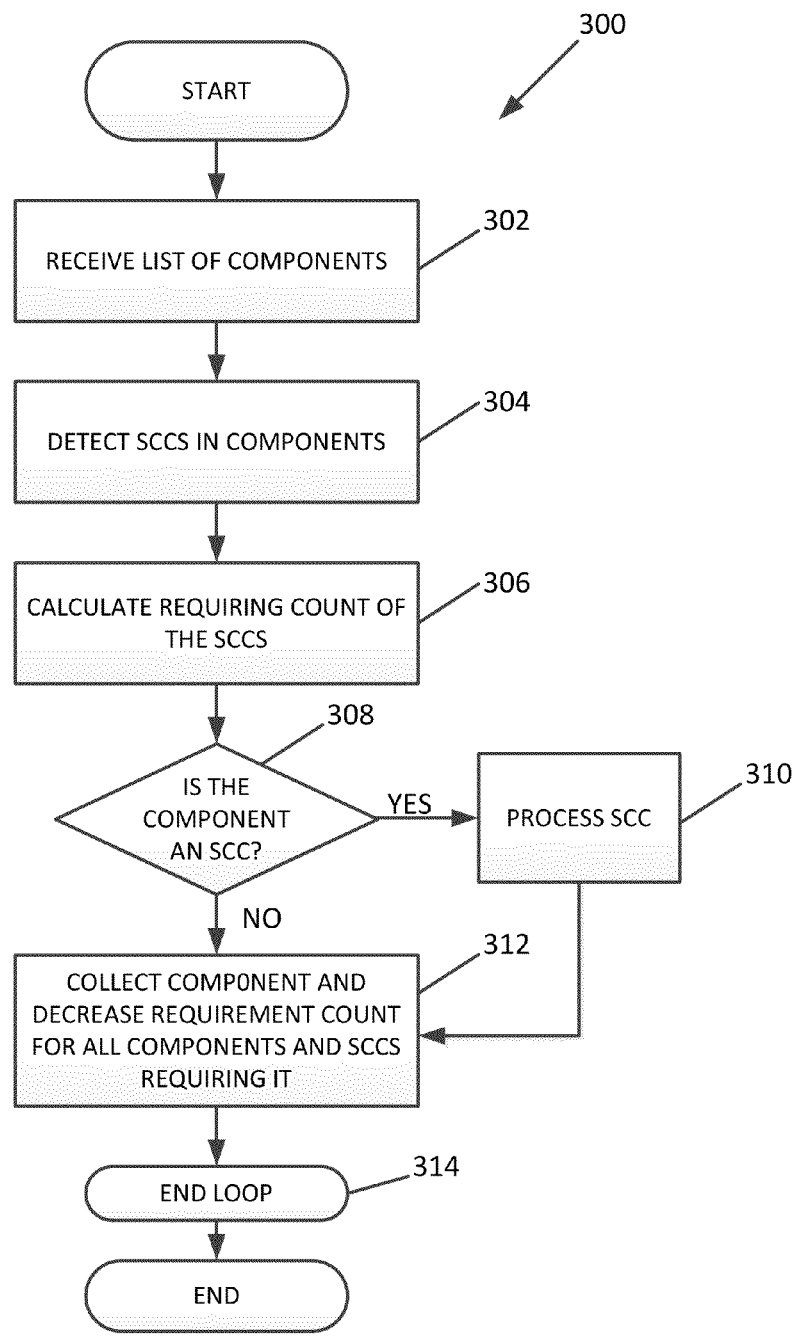
FIG. 3A is a flowchart of one embodiment to collect software package components for installation.

As described above, the problem in installing components is when the components have circular dependencies. Installing one component that has a circular dependency before another can result in an improper install. In one embodiment, the package manager scans the the list of components to components to determine which of the strongly connected components to install first. FIG. 3A is a flowchart of one embodiment of a process 300 to collect software package components for installation. The process 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a package manager, such as package manager 106 of FIG. 1.

Referring to FIG. 3A, process 300 begins with processing logic receiving a list of the components at block 302. As described above, a component is a software package that can be installed on a client computer, such as client computer 102 of FIG. 1, above. The list of components also includes the dependency information between the components. In one embodiment, the dependency information includes which component is dependent on which supporting component. In addition, the dependency information includes the type of dependency information (e.g., normal or prerequisite) for each dependent relation.

At block 304, process 300 detects the strongly connected components in the list of components. At block 306, process 300 calculates a requiring count for each of the strongly connected components. In one embodiment, process 300 detects the strongly connected components using a directed graph of the components. In one embodiment, process 300 generates a directed graph of components using the dependency information. In one embodiment, process 300 generates a directed graph where each edge of the directed graph designates a dependency relationship between the connecting vertices of the edge. In one embodiment, process 300 generates one or more graphs, such as the graph 200 illustrated in FIG. 2 above. As described above, these graphs can have circular dependencies that make installing the software packages complicated.

A candidate component to collect is a component that does not have prerequisites (outside of a strongly connected component) that have not been collected. The prerequisites inside the strongly connected component are subtracted from the requiring count for this purpose. In one embodiment, process 300 runs a depth search first algorithm on the directed graph to determine the strongly connected components. As described above, a strongly connected component is a component that has a dependency path on the directed graph to a second component and the second component has another dependency path back to that original component. In one embodiment, a strongly connected component is a candidate component.

In one embodiment, process 300 uses a depth-first search algorithm to determine the strongly connected components in the directed graph. In one embodiment, a strongly connected component has more than one node in the graph. As known in the art, a depth-first search algorithm traverses a graph by following all edges of one successor before following the edge to the next successor. In one embodiment, a successor is of a node is a node to which an edge leads to from this node. A successor can be one or more next nodes in the graph seen from a selected node. As a result the algorithm follows edges as long as possible before stepping back. In one embodiment, process 300 uses Tarjan's algorithm to determine the strongly connected components. In this embodiment, the strongly connected components form subtrees of a search tree of the directed graph. The roots of the subtree will be the roots of the strongly connected components. In addition, the nodes of the search tree are placed on a stack in the order in which they are visited. When process 300 returns from a subtree, the nodes of the subtree are taken from the stack and process 300 determines whether each node is a root of a strongly connected component. If a node is a root of a strongly connected component, then this node and all the nodes taken off the stack to form the set of strongly connected components.

The requiring count is a count of the number of components that one component depends on. For example in one embodiment, if one component depends on five other components, the requiring count of that component is five.

Process 300 further executes a processing loop (block 308-314) to collect the components for each component and strongly connected component that has a requirement count of zero. In one embodiment, the requirements are external requirements. In this embodiment, the requirements within a strongly connected component are subtracted from the sum of the requirement counts for all the strongly connected component members. At block 308, process 300 determines if the component a strongly connected component. If so, process 300 processes the strongly connected component at block 310. Processing the strongly connected component is further described in FIG. 3B below. If the component is not a strongly connected component, process 300 collects the component and decreases the requirement count for the components and strongly connected components requiring that component at block 312. The processing loop ends at block 314.

Figure 3B:
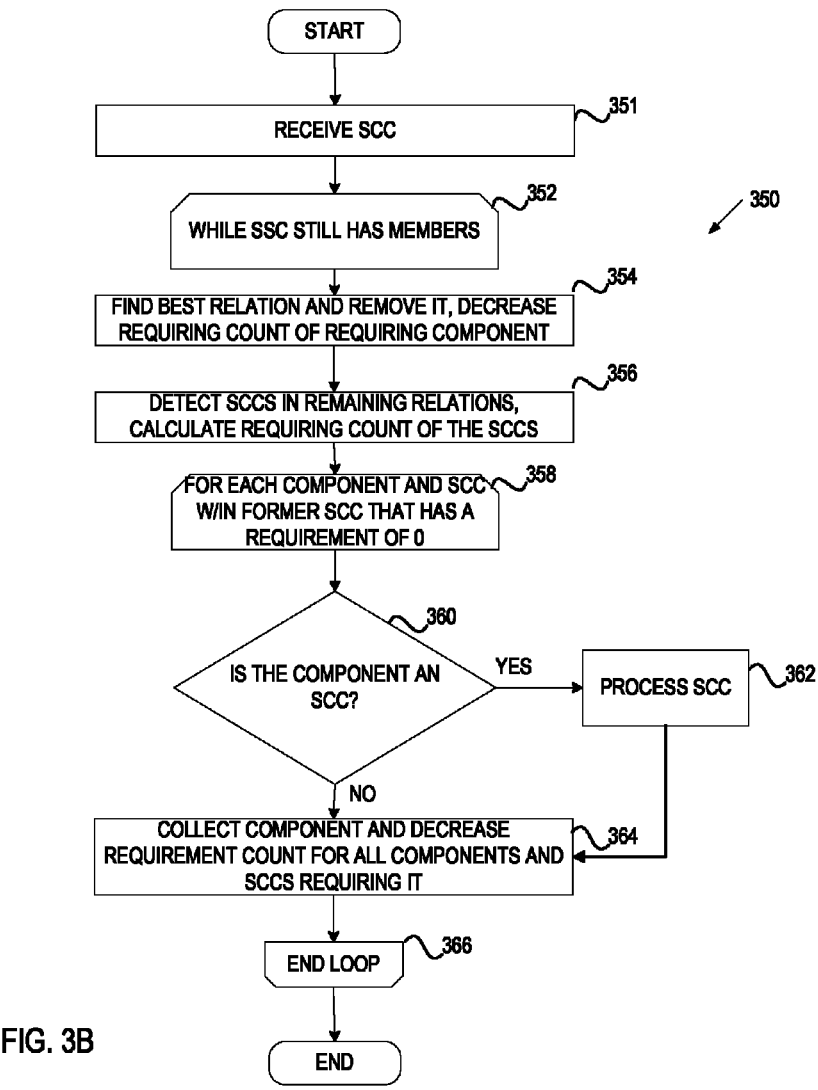
FIG. 3B is a flowchart of one embodiment to process strongly connected components for installation.

FIG. 3B is a flowchart of one embodiment of a process 350 to process strongly connected components. The process 350 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a package manager, such as package manager 106 of FIG. 1.

Referring to FIG. 3B process 350 begins by receiving the strongly connected component to be processed at block 351. In one embodiment, process 350 receives the strongly connected component from process 300, which invokes process 350 to process the strongly connected component (e.g., block 310 of FIG. 3A above). In another embodiment, the strongly connected component is received from a recursive call to process 350 (e.g., block 362 of FIG. 3B below). In one embodiment the strongly collected component includes a directed graph of the strongly connected component and its associated dependency information.

Process 350 further includes a first processing loop (blocks 352-366) to process the strongly connected component while the strongly connected component still has members. At block 354, process 350 finds the best relation and removes that relation. In one embodiment, process 350 finds the best relation by determining if the received strongly coupled component has any prerequisite supporting components. As described above, a prerequisite supporting component is a supporting component that is used during the install of a dependent component. If the strongly coupled component does not have any prerequisite supporting component, process 300 collects the supporting components underneath the strongly coupled component in the directed graph. For example in one embodiment, to collect the dependent components, process 350 runs the install script for each component to be collected. In this embodiment, process 300 removes the collected components from the directed graph.

If the strongly coupled component does have prerequisite supporting components, process 350 determines the furthest prerequisite supporting component using Dijkstra's algorithm. Process 350 deletes the furthest supporting component from the received strongly coupled component. In one embodiment, by deleting the furthest component relation, the directed graph is altered and one of the circular dependencies is removed from the directed graph. For example, and in one embodiment, in FIG. 2, if the component 202C is a strongly coupled component and each of components are prerequisite supporting components, component 202H would be removed from the graph 200. In this embodiment, this would remove the loop consisting of components 202C, 202D, 202G, 202H, 202F, 202C. By removing component 202H, component 202G is no longer a strongly connected component.

Furthermore, at block 354, process 350 decreases the requiring count of the strongly connected component. In one embodiment, process 300 decreases the component's requiring count by one for each relation that is removed.

At block 356, process 350 detects if there are any newly found strongly connected component in the remaining relations of the received strongly connected component. In addition, process 350 calculates the requiring count of the the newly found strongly connected component.

Process executes a second processing loop (blocks 358-366) to collect the components for each component and strongly connected component that has a requirement count of zero. At block 360, process 350 determines if the component a strongly connected component. If so, process 350 processes this strongly connected component at block 362. In one embodiment, process 350 recursively invokes itself with the current strongly connected component found at block 356. In this embodiment, Processing the strongly connected component is further described in FIG. 3B below. If the component is not a strongly connected component, process 350 collects the component and decreases the requirement count for the components and strongly connected components requiring that component at block 364. The processing loop ends at block 366.

Figure 4A:
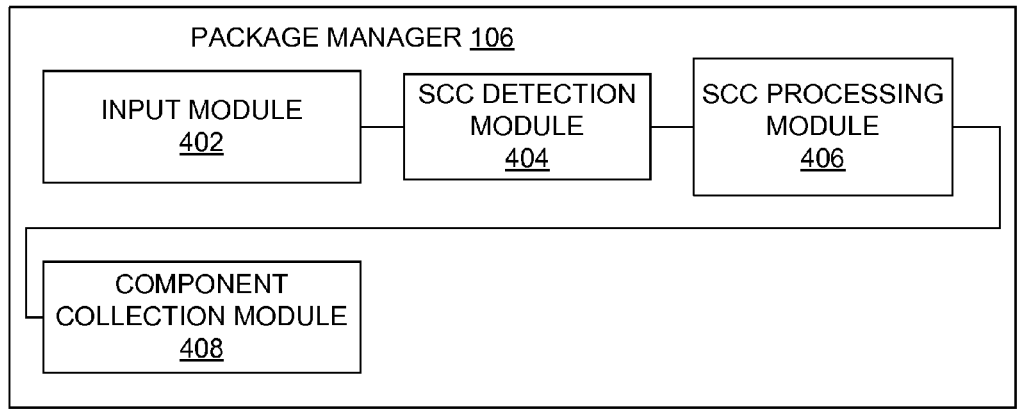
FIG. 4A is a block diagram of a package manager that collects the software package components for installation.
Figure 4B:
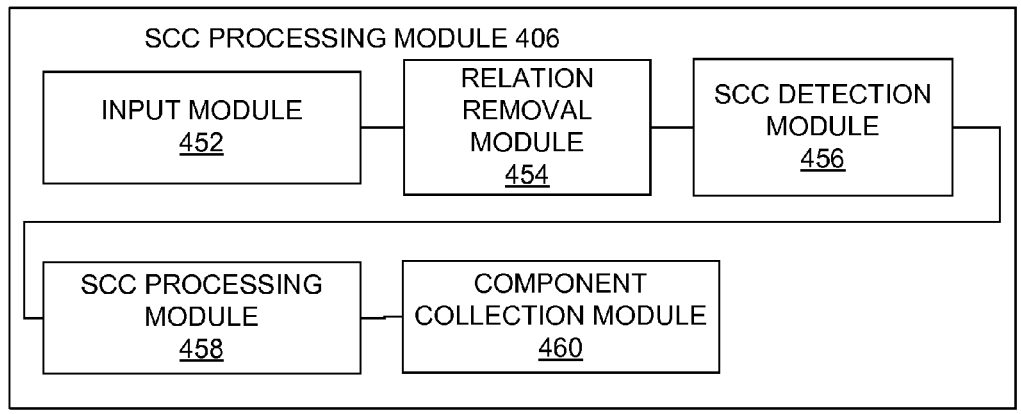
FIG. 4B is a block diagram of a strongly connected component processing module 406 that processes the input strongly connected component.

FIG. 4A is a block diagram of a package manager 106 that collects the software package components for installation. In one embodiment, package manager 106 is a package manager that controls the installation of software packages, such as package manager 106 as illustrated in FIG. 1. In FIG. 4A, package manager 106 includes input module 402, strongly coupled component (SCC) detection module 404, SCC processing module 406, and component collection module 408. Input module 402 receives the list of components, including the dependency information, as described in FIG. 3, block 302. SCC detection module 404 detects strongly coupled components in the input component as described in FIG. 3, block 304. SCC processing module 406 processes the SCCs included in the input component as described in FIG. 3, block 310. Component collection module 408 collects the components as described in FIG. 3A, block 312. FIG. 4B is a block diagram of a SCC processing module 406 that processes the input SCC. In FIG. 4B, SCC processing module 406 includes input module 452, relation removal module 454, SCC detection module 456, SCC processing module 458, and component collection module 460. Input module 452 receives the input SCC as described in FIG. 3B, block 351. Relation removal module 454 removes the best relation as described in FIG. 3B, block 354. SCC detection module 456 detects SCCs in the input SCC as described in FIG. 3B, block 356. SCC processing module 458 process detected SCCs as described in FIG. 3B, block 362. Component collection module 460 collects the component as described in FIG. 3B, block 364.

Figure 5:
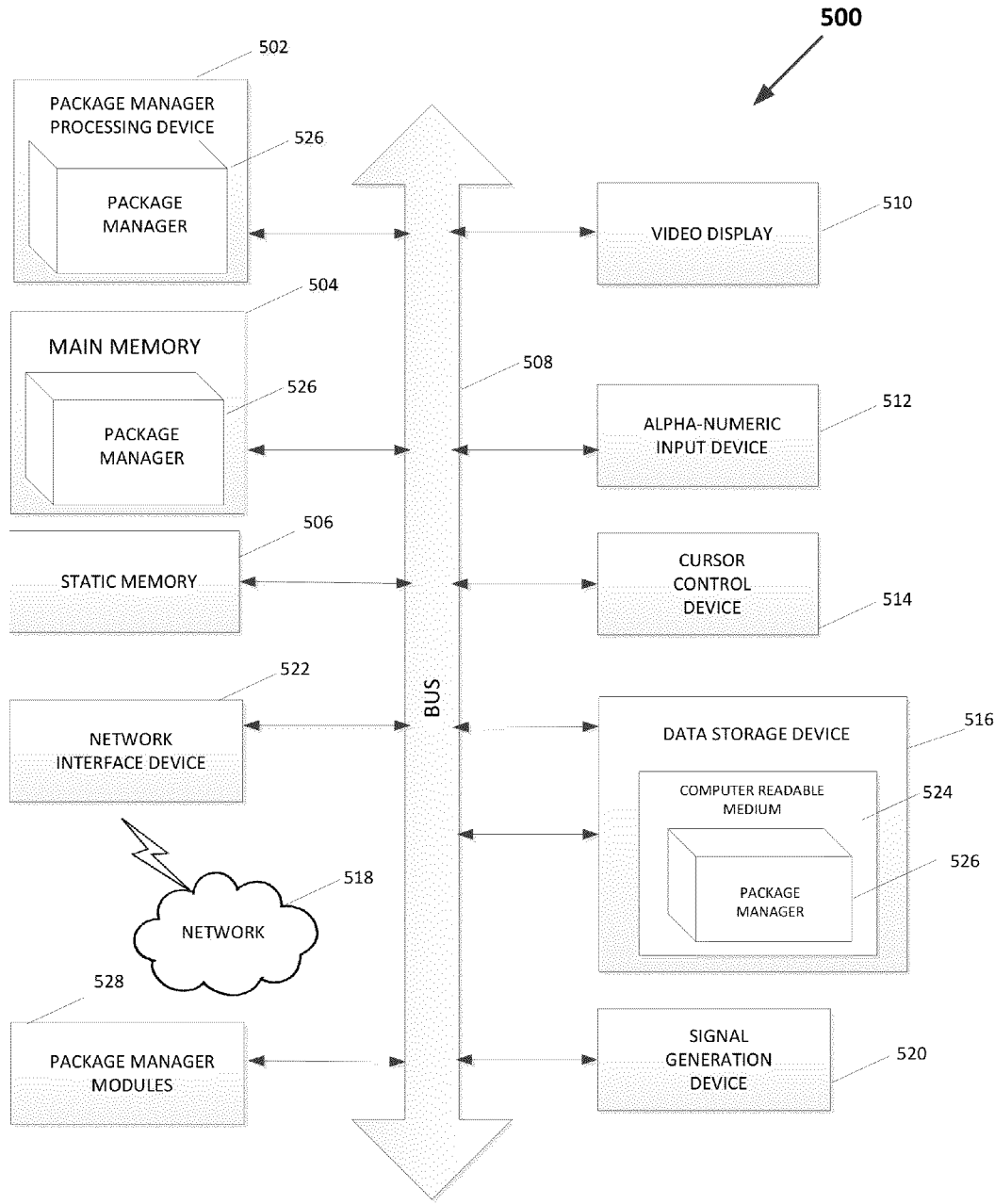
FIG. 5 is a diagram of one embodiment of a computer system that manages installation of software package components.

FIG. 5 is a diagram of one embodiment of a computer system that manages the installation of software package components. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., either a client computer or the server computer managing software packages) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a package manager processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Package manager processing device 502 represents one or more general-purpose processing devices such as a microprocessor, central processing unit, or the like. More particularly, the package manager processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Package manager processing device 502 may also be one or more special-purpose processing devices such as an application specific integrated circuit (ASIC), a field programmable gate array (FPGA), a digital signal processor (DSP), network processor, or the like. Package manager processing device 502 is configured to execute the package manager 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., the package manager 526) embodying any one or more of the methodologies or functions described herein. The package manager 526 may also reside, completely or at least partially, within the main memory 504 and/or within the package manager processing device 502 during execution thereof by the computer system 500, the main memory 504 and the package manager processing device 502 also constituting machine-readable storage media. The package manager 526 may further be transmitted or received over a network 518 via the network interface device 522.

The computer-readable storage medium 524 may also be used to store the package manager 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The package manager modules 528, components and other features described herein (for example in relation to FIG. 1) can be implemented as discrete hardware components or integrated in the functionality of hardware components such as ASICS, FPGAs, DSPs or similar devices. In addition, the package manager modules 528 can be implemented as firmware or functional circuitry within hardware devices. Further, the package manager modules 528 can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "collecting," "installing," "performing," "deleting," "generating," "running," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for managing software packages been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a plurality of components, wherein the plurality of components comprise dependency information among the plurality of components;
generating a graph of component dependencies from the dependency information among the plurality of components;
determining by a processing device, a strongly coupled component from the graph, wherein the strongly coupled component comprises the component from the plurality of components having a dependent component from the plurality of components dependent on the component;
determining a best relation in the strongly coupled component when the strongly coupled component comprises a supporting component;
removing the best relation from the strongly coupled component in the graph; and
processing the strongly coupled component to be installed on a client computer.

2. The method of claim 1, wherein each component in the plurality of components has a requirement count that indicates a number of other components in the plurality of components that depend on the component.

3. The method of claim 2, wherein determining the strongly coupled component comprise:
performing a depth first search on the graph to determine a strongly connected component.

4. The method of claim 3, where the depth first search is in view of Tarjan's algorithm.

5. The method of claim 3, wherein the dependent component having a first path to the supporting component and the supporting component having a second path to the dependent component in the graph.

6. The method of claim 1, wherein the supporting component of the strongly coupled component is used in the installation of the strongly coupled component.

7. The method of claim 1, wherein the supporting component of the strongly coupled component is used in running of the strongly coupled component.

8. The method of claim 1, wherein the component is a software installation package.

9. The method of claim 8, wherein the software installation package is one of a complete installation package or an upgrade installation package.

10. A non-transitory computer readable storage medium having instructions stored thereon that, when executed by a processing device, cause the processing device to perform operations comprising:
receiving a plurality of components, wherein the plurality of components comprise dependency information among the plurality of components;
generating a graph of component dependencies from the dependency information among the plurality of components;
determining by the processing device, a strongly coupled component from the graph, wherein the strongly coupled component comprises the component from the plurality of components having a dependent component from the plurality of components dependent on the component;
determining a best relation in the strongly coupled component when the strongly coupled component comprises a supporting component;
removing the best relation from the strongly coupled component in the graph; and
processing the strongly coupled component to be installed on a client computer.

11. The non-transitory computer readable storage medium of claim 10, wherein each component in the plurality of components has a requirement count that indicates a number of other components in the plurality of components that depend on the component.

12. The non-transitory computer readable storage medium of claim 11, wherein the determining the strongly coupled component comprise:
performing a depth first search on the graph to determine a strongly connected component.

13. The non-transitory computer readable storage medium of claim 12, where the depth first search is in view Tarjan's algorithm.

14. The non-transitory computer readable storage medium of claim 12, wherein the dependent component having a first path to the supporting component and the supporting component having a second path to the dependent component in the graph.

15. The non-transitory computer readable storage medium of claim 10, wherein the component is a software installation package.

16. A system comprising:
memory; and
a processing device coupled to the memory to:

receive a plurality of components, wherein the plurality of components comprise dependency information among the plurality of components;

generate a graph of component dependencies from the dependency information among the plurality of components;

determine a strongly coupled component from the graph, wherein the strongly coupled component comprises the component from the plurality of components having a dependent component from the plurality of components dependent on the component;

determine a best relation in the strongly coupled component when the strongly coupled component comprises a supporting component;

remove the best relation from the strongly coupled component in the graph; and process the strongly coupled component to be installed on a client computer.

17. The system of claim 16, wherein each component in the plurality of components has a requirement count that indicates a number of other components in the plurality of components that depend on the component.

18. The system of claim 16, wherein the determine of the strongly coupled component comprise perform a depth first search on the graph to determine a strongly connected component.

19. The system of claim 18, wherein the dependent component having a first path to the supporting component and the supporting component having a second path to the dependent component in the graph.

20. The system of claim 16, wherein the component is a software installation package.

* * * * *